(12) United States Patent
Tsuge et al.

(10) Patent No.: US 11,041,563 B2
(45) Date of Patent: Jun. 22, 2021

(54) TRANSMISSION CONTROL DEVICE FOR VEHICLE

(71) Applicant: HITACHI AUTOMOTIVE SYSTEMS, LTD., Hitachinaka (JP)

(72) Inventors: Munetoshi Tsuge, Tokyo (JP); Takashi Tsutsui, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 119 days.

(21) Appl. No.: 16/463,063

(22) PCT Filed: Feb. 28, 2018

(86) PCT No.: PCT/JP2018/007433
§ 371 (c)(1),
(2) Date: May 22, 2019

(87) PCT Pub. No.: WO2018/168459
PCT Pub. Date: Sep. 20, 2018

(65) Prior Publication Data
US 2019/0277397 A1 Sep. 12, 2019

(30) Foreign Application Priority Data
Mar. 15, 2017 (JP) .............................. JP2017-049434

(51) Int. Cl.
*F16H 61/16* (2006.01)
*F16H 59/48* (2006.01)
(Continued)

(52) U.S. Cl.
CPC ............. *F16H 59/48* (2013.01); *F16H 59/46* (2013.01); *F16H 59/60* (2013.01); *F16H 61/04* (2013.01);
(Continued)

(58) Field of Classification Search
CPC .......... F16H 59/46; F16H 59/48; F16H 59/18; F16H 59/44; F16H 59/60; F16H 61/0213;
(Continued)

(56) References Cited

U.S. PATENT DOCUMENTS 4,977,992 A * 12/1990 Ohtsuka .................. F16H 61/16
477/120
5,738,605 A * 4/1998 Fliearman ............... F16H 61/10
477/108

(Continued)

FOREIGN PATENT DOCUMENTS

JP 2001-324004 A 11/2001
JP 2001-342862 A 12/2001
(Continued)

OTHER PUBLICATIONS

International Search Report with English translation and Written Opinion issued in corresponding application No. PCT/JP2018/007433 dated Jun. 19, 2018.
(Continued)

*Primary Examiner* — Edwin A Young
(74) *Attorney, Agent, or Firm* — Foley & Lardner LLP (57) ABSTRACT

The present invention provides a transmission control device for a vehicle capable of changing a threshold of a shift map for determining shift-up, thereby preventing occurrence of the shift-up during depression of an accelerator and preventing occurrence of a torque interruption. In a transmission control device for a vehicle 1 including a T/M-ECU 50 which automatically performs shift control for switching a plurality of shift gears of a transmission 20 for shift-up or shift-down, the T/M-ECU 50 has a shift threshold setting unit 54 which sets a shift threshold to be used for the shift control, on the basis of an operation plan or a surrounding state of the vehicle 1, and the shift threshold setting unit 54 sets the shift threshold to perform the shift control on the
(Continued)

transmission 20 so as not to perform the shift-up of the transmission 20 during acceleration of the vehicle 1.

9 Claims, 3 Drawing Sheets (51) Int. Cl.
  *F16H 59/46* (2006.01)
  *F16H 61/04* (2006.01)
  *F16H 61/682* (2006.01)
  *F16H 59/60* (2006.01)
  *F16H 59/66* (2006.01)

(52) U.S. Cl.
  CPC ........... *F16H 61/682* (2013.01); *F16H 61/16* (2013.01); *F16H 2059/663* (2013.01)

(58) Field of Classification Search
  CPC .. F16H 61/04; F16H 2061/0492; F16H 61/16; F16H 2061/163
  See application file for complete search history.

(56) References Cited

U.S. PATENT DOCUMENTS

| | | | |
|---|---|---|---|
| 5,820,517 A * | 10/1998 | Saito | B60W 10/06 477/109 |
| 5,961,420 A | 10/1999 | Darnell | |
| 6,085,137 A * | 7/2000 | Aruga | F16H 59/66 701/51 |
| 6,098,004 A * | 8/2000 | Grytzelius | F16H 61/10 477/120 |
| 6,527,672 B1 | 3/2003 | Henneken et al. | |
| 7,311,638 B2 | 12/2007 | Kumazawa et al. | |
| 8,855,877 B2 * | 10/2014 | Probert | F16H 61/10 701/58 |
| 2005/0090962 A1 * | 4/2005 | Ota | F16H 61/70 701/51 |
| 2008/0228362 A1 * | 9/2008 | Muller | B60W 10/06 701/54 |
| 2009/0192017 A1 * | 7/2009 | Lee | F16H 61/143 477/169 |
| 2013/0151093 A1 * | 6/2013 | Dourra | F16H 61/08 701/59 |

FOREIGN PATENT DOCUMENTS

| | | |
|---|---|---|
| JP | 2002-156036 A | 5/2002 |
| JP | 2002-227995 A | 8/2002 |
| JP | 2003-329123 A | 11/2003 |
| JP | 2008-081118 A | 4/2008 |
| JP | 2010-112502 A | 5/2010 |

OTHER PUBLICATIONS

Extended European Search Report issued in European Patent Application No. 18768491.5 dated Nov. 19, 2020, (9 pages).

\* cited by examiner

TRANSMISSION CONTROL DEVICE FOR VEHICLE

TECHNICAL FIELD

The present invention relates to a transmission control device for a vehicle.

BACKGROUND ART

In a vehicle including a multi-stage transmission such as an automatic transmission (AT) and an automated manual transmission (AMT), if a clutch is released according to shift-up during acceleration by depression of an accelerator, a time for which an engine torque is not transmitted to the tire side occurs (hereinafter, referred to as a torque interruption). Particularly, in the AMT that controls a single clutch on the basis of a manual transmission (MT) and performs shift-up/shift-down automatically, a long-time torque interruption occurs as compared with other transmission systems.

If the torque interruption suddenly occurs during the acceleration of the vehicle, a driver who drives the vehicle receives an impact due to the sudden torque interruption (hereinafter, referred to as a torque interruption shock).

Due to the occurrence of the torque interruption, even though the driver depresses the accelerator to accelerate the vehicle, a time for which the acceleration expected by the driver (or an automated driving electronic control unit (ECU)) is not obtained occurs. As a result, drivability of the driver is impaired. Further, riding comfort of the driver is impaired due to the occurrence of the torque interruption shock.

By reducing a depression amount of the accelerator immediately before the shift-up, the driver (or the automated driving ECU) can reduce the torque interruption shock. However, a time for which the vehicle cannot be accelerated further increases.

A method in which, even if the driver keeps depressing the accelerator, the ECU performs control to temporarily loosen a throttle for adjusting an amount of air to be sent to an engine, thereby mitigating the torque interruption shock at the time of the shift-up (performing control for releasing the clutch after loosening the throttle little by little, before releasing the clutch) is also considered. However, in the above method, the torque interruption shock can be mitigated. However, the torque interruption occurs, and as a result of performing the control for loosening the throttle by the ECU, the time for which the vehicle cannot be accelerated rather increases.

Here, technologies in which, in the ECU, a plurality of types of shift maps used to determine whether or not to perform the shift-up of the multi-stage transmission are prepared and a shift map selected according to a traveling state of the vehicle is selected are disclosed (PTL 1, PTL 3, and PTL 4).

Further, technology for performing shift control of the multi-stage transmission on the basis of a relative speed between an own vehicle and a preceding vehicle, an inter-vehicle distance, and a target inter-vehicle distance is disclosed (PTL 2).

CITATION LIST

Patent Literature

PTL 1: JP 2010-112502 A
PTL 2: JP 2008-81118 A
PTL 3: JP 2003-329123 A
PTL 4: JP 2001-342862 A

SUMMARY OF INVENTION

Technical Problem

However, the technologies of PTL 1 to PTL 4 do not control the multi-stage transmission so that the shift-up does not occur during the acceleration of the vehicle, and cannot prevent the torque interruption due to the occurrence of the shift-up during the acceleration of the vehicle.

The present invention has been made in view of the above problems and an object thereof is to provide a transmission control device for a vehicle capable of changing a threshold of a shift map for determining shift-up, thereby preventing occurrence of the shift-up during depression of an accelerator and preventing occurrence of a torque interruption.

Solution to Problem

In order to achieve the above object, a transmission control device for a vehicle according to a first invention described in claim 1 is a transmission control device for a vehicle including a control unit which automatically performs shift control for switching a plurality of gears of a multi-stage transmission for shift-up or shift-down. The control unit has a shift threshold setting unit which sets a shift threshold to be used for the shift control, on the basis of an operation plan or a surrounding state of the vehicle, and the shift threshold setting unit sets the shift threshold to perform the shift control on the multi-stage transmission so as not to perform the shift-up of the multi-stage transmission during acceleration of the vehicle.

Further, in a transmission control device for a vehicle according to a second invention described in claim 2, in the first invention, the shift threshold setting unit sets the shift threshold, on the basis of an upper limit vehicle speed of the vehicle to be predicted during an acceleration period until the vehicle starts to accelerate and then reduces an acceleration amount.

Further, in a transmission control device for a vehicle according to a third invention described in claim 3, in the first invention, a measurement unit which measures the presence or absence of other vehicle located in front of the vehicle and a distance and/or a relative speed between the vehicle and other vehicle is included. The presence or absence of other vehicle and the distance or the relative speed between the vehicle and other vehicle, measured by the measurement unit, are used to determine the surrounding state.

Advantageous Effects of Invention

According to the present invention, since occurrence of a torque interruption shock in a multi-stage transmission is prevented, it is not necessary for a driver to perform a complicated operation such as temporarily loosening an accelerator near shift timing during acceleration of a vehicle. Therefore, for the driver, drivability of the vehicle is improved.

Further, when the vehicle is accelerated on the basis of a driver's intention or an operation plan of an automated driving ECU, it is possible to perform the acceleration as expected by the driver or the automated driving ECU without occurrence of a torque interruption state. As a result, for the driver, the drivability of the vehicle is improved, and for the automated driving ECU, driving can be reliably performed according to the operation plan and a degree of freedom of the operation plan is improved.

DESCRIPTION OF EMBODIMENTS

[Entire Structure of Vehicle]

Hereinafter, an embodiment of the present invention will be described on the basis of the drawings. In the embodiment, a vehicle 1 including an AMT will be described. However, the present invention is not limited thereto, and a vehicle including a transmission having a multi-stage transmission may be used and a vehicle including an AT having a multi-stage transmission may be used.

Figure 1:
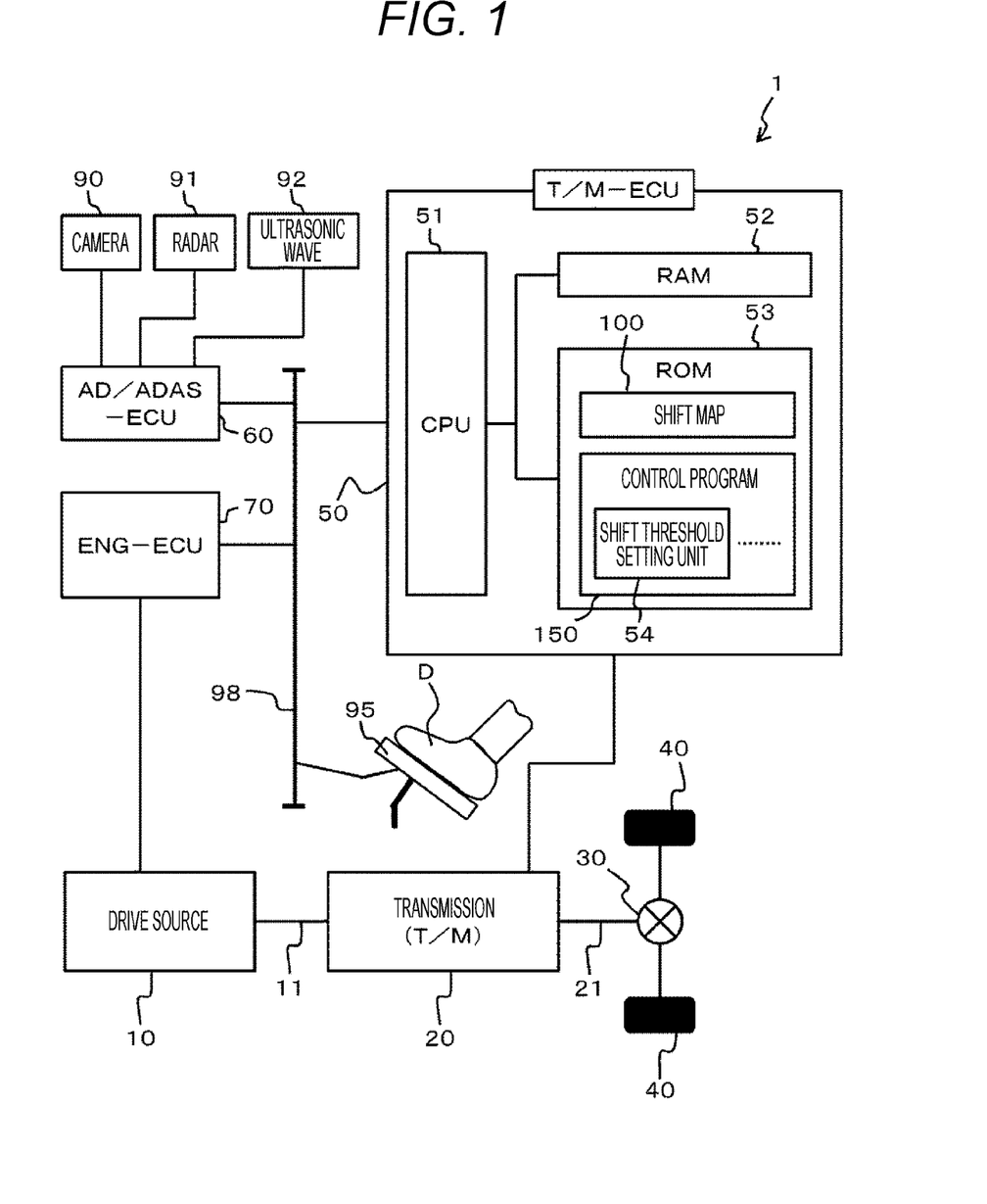
FIG. 1 is a block diagram illustrating an entire structure of a vehicle according to the present invention.

FIG. 1 is a block diagram illustrating an entire structure of the vehicle 1 according to the present invention.

As shown in FIG. 1, in the vehicle 1, a transmission (T/M) 20 is connected to an output shaft 11 of a drive source 10 and a rotation number of the output shaft 11 is shifted to a predetermined rotation number by the transmission 20.

The rotation number of the output shaft 11 shifted by the transmission 20 is transmitted to a propeller shaft 21 to be the input side of a differential gear 30 and is transmitted to left and right tires 40 and 40 via the differential gear 30.

The drive source 10 has a configuration generally used as a drive source of the vehicle, such as an internal combustion engine such as an engine, a motor, and a combination of the internal combustion engine and the motor.

The transmission 20 is a multi-stage transmission with a plurality of gears having different numbers of teeth. By selecting an optimum gear from the plurality of gears, the transmission 20 converts the rotation number of the drive source 10 (output shaft 11) into a desired rotation number or changes the rotation direction and transmits it.

In the embodiment, the transmission 20 has five shift gears of a first gear, a second gear, a third gear, a fourth gear, and a fifth gear not shown in the drawing. The shift gears are sequentially switched from the first gear to the fifth gear, so that it is possible to shift the vehicle 1 from low-speed traveling to high-speed traveling.

Further, any shift gear of the first to fifth gears is appropriately switched, so that acceleration or deceleration of the vehicle 1 is smoothly performed.

Further, there is a clutch (or a torque converter) not shown in the drawing between the shift gears in the transmission 20 and the drive source 10. When the shift gear is shifted, the clutch is temporarily disconnected and the clutch is connected again after switching the shift gear.

Switching of the shift gear is performed by a T/M-ECU 50.

The T/M-ECU 50 automatically performs switching of each shift gear, on the basis of a shift map 100 (refer to FIG. 2) having a shift threshold defined by a relation between a speed of the vehicle (vehicle speed) and a depression amount of an accelerator 95 (accelerator opening).

The T/M-ECU 50 has a CPU 51, a RAM 52 for temporarily storing data processed by the CPU 51, and a ROM 53 for storing the shift map 100 and a control program 150 executed by the CPU 51. The control program 150 includes a shift threshold setting unit 54.

The T/M-ECU 50 constitutes a control unit of the present invention.

The central processing unit (CPU) 51 is a so-called microprocessor, and reads and executes the control program 150 stored in the ROM 53 to perform processing for controlling switching of the shift gear of the transmission 20.

The random access memory (RAM) 52 is a volatile memory, and has a work area in which data processed by the CPU 51 is temporarily stored so as to be readable and writable. The data processed by the CPU 51 is temporarily stored in the RAM 52, and the stored data is read by the CPU 51 and is used again for processing by the CPU 51.

The read only memory (ROM) 53 is a non-volatile memory, and the control program 150 necessary for the T/M-ECU 50 to execute control for switching the shift gear of the transmission 20 is stored in the ROM 53. The control program 150 is read and executed by the CPU 51.

The shift map 100 used by the CPU 51 to determine timing at which the shift gear of the transmission 20 is switched is stored in the ROM 53. The shift map 100 is read by the CPU 51 and is temporarily stored in the RAM 52.

The shift threshold setting unit 54 included in the control program 150 calculates a shift threshold used in the shift map 100, on the basis of a surrounding state of the vehicle 1 or an operation plan preset in the case of automated driving, and resets (changes) the shift threshold of the shift map 100 temporarily stored in the RAM 52 to the calculated new shift threshold.

Information of the surrounding state of the vehicle 1 to be used by the shift threshold setting unit 54 is acquired by an AD/ADAS-ECU 60 mounted on the vehicle 1.

The AD/ADAS-ECU 60 is an ECU of a system for automatically driving a vehicle or assisting driving by a driver D, and is generally called an automated driving/advanced driver assistance system.

The AD/ADAS-ECU 60 is connected to a camera (stereo camera) 90 for photographing the surroundings of the vehicle 1, a radar 91 for detecting an object around the vehicle 1, and an ultrasonic wave 92.

The AD/ADAS-ECU 60 determines the surrounding state of the vehicle 1, on the basis of information obtained by the camera 90, the radar 91, and the ultrasonic wave 92.

For example, the AD/ADAS-ECU 60 determines whether or not there is a preceding vehicle Cf in front of the vehicle 1, on the basis of a photographed image of the camera 90 which has photographed the front of the vehicle 1 (own vehicle). When there is the preceding vehicle Cf, the AD/ADAS-ECU 60 calculates a distance $S(t)$ and a relative speed $Vr(t)$ between the preceding vehicle Cf and the vehicle 1. Further, in the case of the automated driving of the vehicle, an immediate operation plan is calculated on the basis of the surrounding state. At this time, an immediate vehicle speed plan $V(t)$ of a time and a vehicle speed is calculated as a part of the operation plan.

Information of the distance $S(t)$ and the relative speed $Vr(t)$ between the preceding vehicle Cf and the vehicle 1, calculated by the AD/ADAS-ECU 60, or the immediate vehicle speed plan $V(t)$ is transmitted to the T/M-ECU 50 via an in-vehicle communication path 98 such as a controller area network (CAN) and is used for calculation of the shift threshold in the shift threshold setting unit 54.

An ENG-ECU 70 is a control device that controls the drive source 10. The ENG-ECU 70 has a CPU, a RAM, a ROM, and the like not shown in the drawing.

In the ENG-ECU 70, the CPU executes a control program stored in the ROM not shown in the drawing, so that processing for controlling the drive source 10 is performed.

For example, the ENG-ECU 70 controls an opening (throttle opening) of a throttle to adjust an amount of air sent to the drive source 10, on the basis of a required drive force or a required rotation number transmitted from the T/M-ECU 50 via the in-vehicle communication path 98. Thereby, in the vehicle 1, an output (rotation number of the output shaft 11) of the drive source 10 is controlled. As a result, a vehicle speed V of the vehicle 1 is adjusted.

The T/M-ECU 50 constitutes a transmission control device of the present invention.

[Shift Map]

Figure 2:
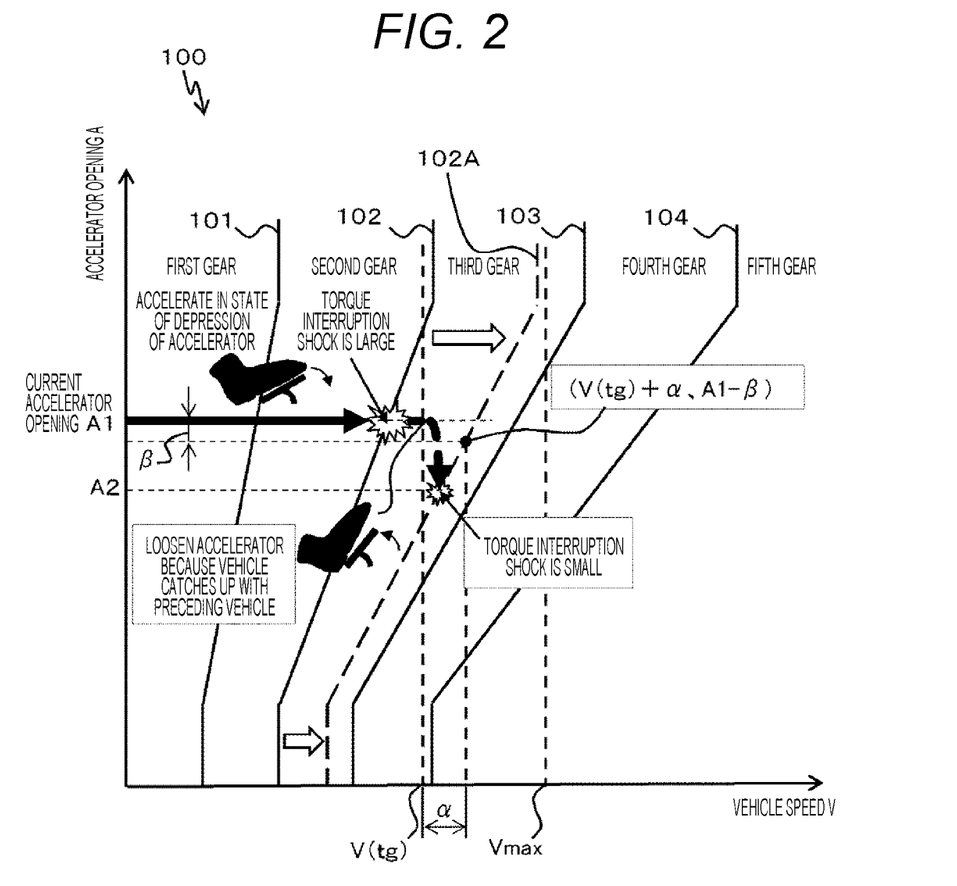
FIG. 2 is a diagram illustrating a shift map according to the present invention.

Next, the shift map 100 that is stored in the ROM 53 will be described.

FIG. 2 is a diagram illustrating the shift map 100.

The T/M-ECU 50 (ROM 53) has shift maps for shift-up and shift-down, respectively, and uses each shift map to determine timing of switching (shift change) of the shift gears (first gear to fifth gear).

The shift map (shift map 100) for the shift-up will be described below and the description of the shift map for the shift-down will be omitted.

The shift map 100 in which a vehicle speed V of the vehicle 1 is represented by a horizontal axis to be one axis and a depression amount (accelerator opening A) of the accelerator 95 by the driver D is represented by a vertical axis to be the other axis is shown.

Since the depression amount (accelerator opening A) of the accelerator 95 and the opening (throttle opening) of the throttle for adjusting the amount of air sent to the drive source 10 (engine) are normally in a correspondence relation, the vertical axis of the shift map 100 may represent the throttle opening indicating the opening of the throttle.

In the shift map 100, a plurality of shift thresholds defined by the vehicle speed V and the accelerator opening A are set.

In the embodiment, a 1-2 shift threshold 101 defining switching timing from the first gear to the second gear, a 2-3 shift threshold 102 defining switching timing from the second gear to the third gear, a 3-4 shift threshold 103 defining switching timing from the third gear to the fourth gear, and a 4-5 shift threshold 104 defining switching timing from the fourth gear to the fifth gear are set.

For example, in the shift map 100, if the driver D depresses the accelerator 95 by a constant amount, the vehicle speed V of the vehicle 1 gradually increases. If the vehicle speed V exceeds the 1-2 shift threshold 101, the T/M-ECU 50 performs control for switching the shift gear of the transmission 20 from the first gear to the second gear and instructs the ENG-ECU 70 to output the drive force or the rotation number according to the transient state at the time of shifting and the gear after shifting. In this way, the shift-up of the transmission 20 is performed.

When the vehicle speed V of the vehicle 1 exceeds each of the 2-3 shift threshold 102, the 3-4 shift threshold 103, and the 4-5 shift threshold 104, the T/M-ECU 50 performs control for switching the shift gear from the second gear to the third gear, from the third gear to the fourth gear, and from the fourth gear to the fifth gear, respectively, so that the shift-up of the transmission 20 is sequentially performed.

As described above, for example, in the shift map 100 shown in FIG. 2, if the current accelerator opening is constant at A1 and the vehicle speed V of the vehicle 1 exceeds the 2-3 shift threshold 102, the shift gear of the transmission 20 is switched from the second gear to the third gear.

Here, when the shift gear is switched from the second gear to the third gear, in the transmission 20, an operation is performed in which the clutch not shown in the drawing is temporarily released and then the clutch is connected again.

In the transmission 20, a time during which the torque of the drive source 10 is not transmitted to the side of the tires 40 and 40 from the clutch release to the reconnection occurs and a so-called torque interruption state occurs. Further, at the time of entering the torque interruption state, an impact (torque interruption shock) occurs due to a change from a state where the torque is applied to a state where the torque is not applied suddenly.

As such, if the accelerator opening is constant at A1 and the torque interruption shock occurs during acceleration of the vehicle 1, a time for which the acceleration expected by depressing the accelerator by the driver D is not obtained occurs, and riding comfort of the vehicle worsens due to the torque interruption shock.

Further, in the case of automatically driving the vehicle, a time for which the vehicle does not accelerate according to the predetermined operation plan occurs and an operation plan should be made in consideration of the time for which the vehicle does not accelerate. For this reason, a degree of freedom of the operation plan becomes narrow.

As a result of earnest research, the present inventors have found that switching control of the shift gear for the shift-up is not performed during the acceleration of the vehicle 1 so as to prevent the torque interruption shock from occurring, thereby preventing the riding comfort of the vehicle 1 from being impaired and increasing the degree of freedom of the operation plan in the case of automatically driving the vehicle 1.

In the embodiment, in the shift map 100 shown in FIG. 2, for example, the shift threshold (2-3 shift threshold 102) defining the timing at which the second gear of the transmission 20 is switched to the third gear is changed to a position shifted to the right side in the drawing as compared with an upper limit vehicle speed V(tg) of the vehicle 1 predicted from the accelerator opening A1 at the current shift position (changed 2-3 shift threshold 102A: broken line in the drawing).

As shown in FIG. 2, in the case of the current accelerator opening A1, the changed 2-3 shift threshold 102A is positioned on the right side in the drawing as compared with the upper limit vehicle speed V(tg) of the vehicle 1 predicted at the current shift position.

Thereby, the vehicle 1 reaches the upper limit vehicle speed V(tg) before switching (shift-up) from the second gear to the third gear. As a result, the driver D performs an operation of loosening the accelerator 95 (the accelerator opening A decreases), on the basis of that the vehicle speed of the vehicle 1 has exceeded the upper limit vehicle speed V(tg).

When the accelerator 95 is loosened and the accelerator opening A becomes an accelerator opening A2 smaller than the accelerator opening A1 during an acceleration period, the vehicle speed V of the vehicle 1 exceeds the changed 2-3 shift threshold 102A, so that the second gear is switched to the third gear at this timing (shift-up).

As a result, in the transmission 20, switching of the shift gear is performed in a state where the accelerator 95 of the vehicle 1 is loosened, so that an influence of the torque interruption shock occurring at the time of switching of the shift gear can be reduced.

Here, in the embodiment, the changed shift threshold (for example, the 2-3 shift threshold 102A) is set to pass through the coordinates (V(tg)+α, A1−β) of (V(tg)+α) larger than the predicted upper limit vehicle speed V(tg) by a margin amount α and (A1−β) smaller than the current accelerator opening A1 by a margin amount β.

As such, in the T/M-ECU 50, by changing the shift threshold of the shift map 100, the shift-up is not performed during the acceleration period during which the vehicle 1 accelerates up to the upper limit vehicle speed V(tg) predicted at the shift position, in a state of the accelerator opening A1.

After the vehicle 1 reaches the upper limit vehicle speed V(tg) predicted at the shift position and the driver D loosens the accelerator 95, the vehicle speed V of the vehicle 1 exceeds the changed 2-3 shift threshold 102A, so that switching (shift-up) from the second gear to the third gear is performed at timing when the driver D loosens the accelerator 95.

That is, loosening of the accelerator 95 by the driver D (or the automated driving ECU) means that the driver D attempts to reduce the acceleration of the vehicle 1. Therefore, by performing the shift-up of the vehicle 1 at this timing, a sense of discomfort when the acceleration is not performed temporarily due to the torque interruption is reduced, and the torque interruption shock is also reduced.

However, since the rotation number of the drive source 10 (engine) at each shift position has an upper limit, and a noise or a vibration of the drive source 10 increases as the rotation number close to the upper limit and fuel efficiency decreases, it is not possible to increase the shift threshold of the shift-up without limitation.

Therefore, in the shift map 100, a maximum vehicle speed Vmax is set for each shift threshold, and each shift threshold is set so as not to exceed each maximum vehicle speed Vmax.

In the embodiment, for example, the changed 2-3 shift threshold 102A is set so as not to exceed the maximum vehicle speed Vmax set by the 2-3 shift threshold 102A (in the drawing, the 2-3 shift threshold 102A is located at the left side of the maximum vehicle speed Vmax).

Next, a method of calculating the upper limit vehicle speed V(tg) of the vehicle 1 will be described.

When the distance S(t) and the relative speed Vr(t) between the preceding vehicle Cf and the own vehicle 1 are received from the AD/ADAS-ECU 60, the upper limit vehicle speed V(tg) of the vehicle 1 can be represented by the following formula.

$$V(tg) = \frac{(a2-a1) \times Vf + \sqrt{(a2-a1) \times a2 \times (Vf^2 - 4Vf \times V(O) + 2V(O)^2 - 2 \times a1(S(O) - (Vf \times tb + \gamma)))}}{a2-a1}$$ [Formula 1]

When the vehicle 1 is driven by the driver D, the upper limit vehicle speed V(tg) represented by the above formula 1 is calculated on the basis of the distance S(t) or the relative speed Vr(t) between the preceding vehicle Cf and the vehicle 1, measured using the camera 90, the radar 91, and the ultrasonic wave 92 mounted on the vehicle 1. Further, when the vehicle 1 is driven automatically, the upper limit vehicle speed V(tg) is calculated on the basis of the operation plan (including the vehicle speed) of the vehicle calculated by the automated driving ECU.

In any case, the upper limit vehicle speed V(tg) can be obtained by calculating the upper limit value of the vehicle speed predicted during the acceleration period from the start of the acceleration of the vehicle 1 to the reduction of the acceleration amount.

[Definition]

Next, a definition for calculating V(tg) will be described.

First, the vehicle speed of the preceding vehicle Cf is constant at Vf and the depression amount of the accelerator 95 by the driver D is constant until the vehicle catches up with the preceding vehicle Cf.

Further, the inter-vehicle distance between the preceding vehicle Cf and the vehicle 1 (own vehicle) is set to S(t), the vehicle speed of the vehicle 1 is set to V (t: start time of the present control is set to t=0), the relative speed between the preceding vehicle Cf and the vehicle 1 is set to Vr(t)=V(t)−Vf, and the target inter-vehicle distance with the preceding vehicle Cf is set to Sb=Vf×tb+γ (tb: idle running time before sudden braking, γ: margin).

Here, the target inter-vehicle distance Sb is a distance at which the vehicle 1 can stop without colliding with the preceding vehicle Cf, when the vehicle 1 stops by sudden braking according to a stop of the preceding vehicle Cf by sudden braking, in a state where the vehicle 1 has caught up with the preceding vehicle Cf (both vehicles have the vehicle speed of Vf).

Further, when it is assumed that a friction coefficient μb between tires and a road surface when the vehicle 1 stops by sudden braking is the same value in the preceding vehicle Cf and the vehicle 1, a distance until the vehicle 1 starts to suddenly brake with the vehicle speed Vf and then stops is the same as $Vf^2/(2 \mu b \times g)$ in both the vehicle 1 and the preceding vehicle Cf.

Therefore, the target inter-vehicle distance Sb can be considered as a value obtained by adding a constant margin γ to an idle running distance (=Vf×tb) until the preceding vehicle Cf starts to suddenly brake and then the vehicle 1 starts to suddenly brake.

Here, tb is considered to be about 0.75 seconds when the driver D of the vehicle 1 views a brake lamp of the preceding vehicle Cf and depresses the brake. However, if sudden braking by a system can be expected, tb can be decreased. In contrast, when the inter-vehicle distance is increased so that the vehicle can be stopped even if the vehicle is not suddenly braked, tb may be set to a large value.

The remaining distance to the target inter-vehicle distance Sb is Sr(t)=S(t)−Sb.

[Method of Calculating Acceleration Based on Torque Curve]

Next, a method of calculating the acceleration of the vehicle 1 based on a torque curve will be described.

First, when an air density is set to ρ, an air resistance coefficient is set to Cd, a front projection area is set to A, a vehicle speed is set to V, a rolling resistance coefficient is set to μ, a vehicle weight is set to M, a gravitational acceleration is set to g, and a road gradient is set to θ, running resistance R (=air resistance+rolling resistance+gradient resistance) excluding acceleration resistance can be represented by the following formula 2.

$$R(V) = \frac{1}{2} \times \rho CdAV^2 + \mu \times Mg \times \cos\theta + Mg \times \sin\theta$$ [Formula 2]

Under preconditions that a vehicle type is specified, a load variation is ignored, and a gradient is 0 degrees, an atmospheric pressure is 1 atm, and a temperature is about 20° C., since θ=0 is satisfied and ρ, Cd, A, M, and g can be considered as constants, the running resistance R can be represented by the following formula 3.

$$R(V) = 1/2 \times \rho C d A V^2 + \mu \times Mg \quad \text{[Formula 3]}$$

Therefore, if the rolling resistance coefficient μ can be specified (or it can be considered as a constant value by μ=about 0.01, when dry asphalt is assumed), it can be plotted as a quadratic curve of the vehicle speed V.

An upper limit is determined by a constant drive force line (a graph plotting a maximum drive force for each vehicle speed with a vehicle speed on a horizontal axis and a drive force on a vertical axis for each shift position) for each vehicle type.

Here, when Mi is set to an equivalent inertia weight of a rotation portion of a drive system (generally, about several percent of a vehicle weight M), a difference between a drive force T(V) at the current accelerator opening A and the vehicle speed V and the running resistance R(V) is matched with acceleration resistance (M+Mi)dV/dt, so that an acceleration a(t)=dV/dt at the current accelerator opening A and the predetermined shift position can be calculated by the following formula 4

$$a(t) = \frac{dV}{dt} = \frac{T(V) - R(V)}{M + Mi} \quad \text{[Formula 4]}$$

Since it is difficult to exactly derive the upper limit vehicle speed V(tg), an approximate solution is derived.

Figure 3:
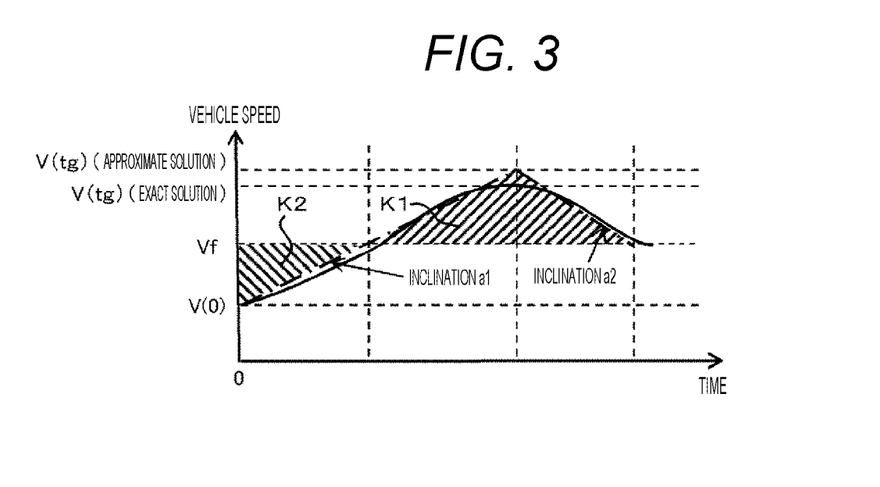
FIG. 3 is a diagram illustrating a method of deriving an upper limit vehicle speed.

FIG. 3 is a diagram illustrating a method of deriving the upper limit vehicle speed V(tg).

As shown in FIG. 3, a vehicle speed change (solid line in the drawing) when the vehicle 1 catches up with the preceding vehicle Cf is approximated by a straight line (one-dotted chain line in the drawing), and its vertex is used as an approximate solution of the upper limit vehicle speed V(tg).

There is no problem even if the upper limit vehicle speed V(tg) has a slight large value.

An inclination of the approximate straight line (solid line in the drawing) is obtained as follows.

First, a maximum value and a minimum value of T(V)−R(V) are calculated between a current vehicle speed (V(0)) and a maximum vehicle speed Vmax at the current shift gear position (shift position), and a1={T(V)−R(V)}mid/(M+Mi) is calculated on the basis of an intermediate value {T(V)−R(V)}mid thereof.

In addition, a maximum value and a minimum value of −R(V) are calculated between the vehicle speed Vf of the preceding vehicle Cf and the maximum vehicle speed Vmax of the current shift gear position (shift position), and a2={−R(V)}min/(M+Mi) is calculated on the basis of an intermediate value {−R(V)}mid thereof.

By the above, when a1 and a2 are determined, the inter-vehicle distance reduced until the vehicle 1 catches up with the preceding vehicle Cf and the vehicle speed becomes Vf is represented by a difference between an area of a region K1 (leftward oblique hatching in FIG. 3) and an area of a region K2 (rightward oblique hatching in the drawing).

Since the reduced inter-vehicle distance becomes equal to Sr(0)=S(0)−(Vf×tb+γ), the following formula 5 is obtained.

$$S(O) - (Vf \times tb + \gamma) = \frac{(V(tg) - Vf)^2}{2 \times a1} - \frac{(V(tg) - Vf)^2}{2 \times a2} - \frac{(Vf - Vf(O))^2}{2 \times a1} \quad \text{[Formula 5]}$$

If a quadratic equation of the formula 5 is solved, the formula 1 is derived as an approximate expression of V(tg).

In the formula 5, a distance S(0) and a relative speed Vr(0) between the vehicle 1 and the preceding vehicle Cf at t=0 can be obtained by measuring the distance between the vehicle 1 and the preceding vehicle Cf using the camera 90 or the radar 91.

Further, the vehicle speed V(0) of the vehicle 1 at t=0 can be obtained by the rotation number (speed) of the tires 40 and 40.

From these, Vf=V(0)−Vr(0) can be obtained.

[Operation of Vehicle]

Next, a function of the present invention will be described together with an operation of the vehicle 1.

Figure 4:
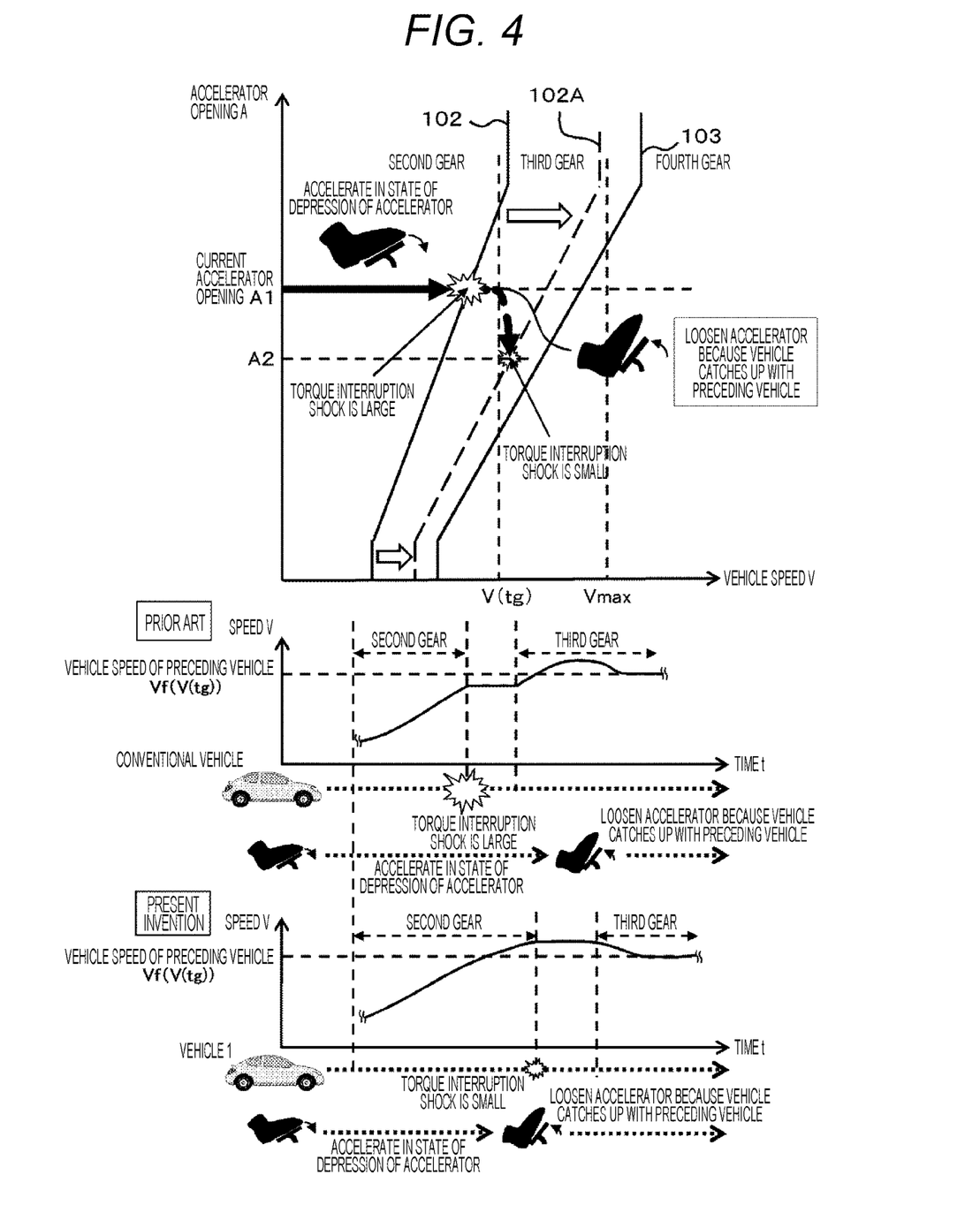
FIG. 4 is a diagram illustrating a vehicle speed change of a vehicle in the case of using a shift map according to the present invention, together with a vehicle speed change of the vehicle in the case of using a conventional shift map.

FIG. 4 is a diagram illustrating the operation (vehicle speed change) of the vehicle in the case of using the shift map 100 of the present invention, together with the operation (vehicle speed change) of the vehicle in the case of using the conventional shift map.

In the vehicle in the case of using the conventional shift map, the second gear is switched to the third gear before the vehicle (own vehicle) is accelerated and reaches the vehicle speed Vf of the preceding vehicle Cf. Since the vehicle (own vehicle) reaches the vehicle speed Vf (upper limit vehicle speed V(tg)) of the preceding vehicle Cf after the shift gear is switched to the third gear, the driver D loosens the accelerator.

As such, in the vehicle (own vehicle) using the conventional shift map, since the shift gear is switched during acceleration at the accelerator opening A1, the impact (torque interruption shock) due to the torque interruption in a state where the accelerator opening is large increases, the riding comfort of the vehicle worsens, and the drivability of the vehicle by the driver is reduced.

Further, since there is a period during which the acceleration cannot be obtained due to the torque interruption during the acceleration period of the vehicle (own vehicle), the driver D feels that it is not possible to obtain expected acceleration according to the depression amount of the accelerator 95. In addition, when the vehicle is operated automatically, the operation plan of the automated driving may be disturbed.

On the other hand, in the vehicle 1 in the case of using the shift map 100 of the present invention, after the vehicle 1 reaches the vehicle speed Vf (upper limit vehicle speed V(tg)) of the preceding vehicle Cf and the driver D loosens the accelerator (after reaching the accelerator opening A2), the second gear is switched to the third gear.

Therefore, the torque interruption occurs in a state where the accelerator opening of the vehicle 1 decreases from A1 to A2, so that the torque interruption shock decreases as compared with the case where the torque interruption occurs in a state of A1 where the accelerator opening is large. Further, in the vehicle 1, it is possible to obtain expected acceleration according to the depression amount of the accelerator 95 by the driver D.

As a result, the drivability of the vehicle by the driver D can be increased, and when the vehicle 1 is driven automatically, the operation plan is not disturbed.

In the embodiment described above, the case where the shift threshold defined by the predetermined shift map 100 is changed on the basis of the surrounding state of the vehicle 1 or the operation plan in the case of the automated driving has been described as an example. However, the present invention is not limited thereto.

For example, in the T/M-ECU 50, a shift map having a shift threshold obtained by previously shifting the shift threshold at each shift position to the high speed side in consideration of the torque interruption shock may be stored in the ROM 53.

Further, in the T/M-ECU 50, a plurality of shift maps having different shift thresholds according to the surrounding state or the operation plan may be stored in the ROM 53, a shift map having an appropriate shift threshold may be read and used according to the surrounding state or the operation plan, and the shift threshold may be changed as described above on the basis of the surrounding state or the operation plan, with respect to the plurality of shift maps.

In this way, the shift map can be adjusted more finely according to the surrounding state or the operation plan, and the drivability of the driver can be improved and the degree of freedom of the operation plan can be increased.

As described above, in the embodiment, (1) in a transmission control device for the vehicle including the T/M-ECU 50 (control unit) which automatically performs shift control for switching a plurality of shift gears (first gear to fifth gear: gears) of the transmission 20 (multi-stage transmission) for shift-up or shift-down, the T/M-ECU 50 has the shift threshold setting unit 54 which sets a shift threshold (for example, the 2-3 shift threshold 102) to be used for the shift control, on the basis of an operation plan or a surrounding state of the vehicle 1, and the shift threshold setting unit 54 sets the shift threshold (for example, the 2-3 shift threshold 102A) to perform the shift control on the transmission 20 so as not to perform the shift-up of the transmission 20 during acceleration of the vehicle 1.

According to this configuration, in the vehicle 1, the shift-up of the transmission 20 is not performed while the vehicle 1 accelerates at the constant accelerator opening A1. As a result, impairing of riding comfort of a driver due to occurrence of the torque interruption shock during the acceleration of the vehicle 1 does not occur.

Further, in the vehicle 1, since the torque interruption does not occur during the acceleration of the vehicle 1, a time for which the vehicle 1 cannot accelerate even though the accelerator 95 is depressed during the acceleration of the vehicle 1 does not occur and the acceleration expected by the driver can be obtained.

Further, when the vehicle is driven automatically, a non-acceleration time unexpected by the automated driving ECU does not occur. Therefore, it is not necessary to consider occurrence of the time for which the vehicle does not accelerate at the time of making the operation plan of the vehicle and it is possible to increase a degree of freedom of the operation plan.

(2) The shift threshold setting unit 54 sets the shift threshold, on the basis of the upper limit vehicle speed V(tg) of the vehicle to be predicted during an acceleration period until the vehicle 1 starts to accelerate and then reduces an acceleration amount.

According to this configuration, after the vehicle speed V of the vehicle 1 exceeds the upper limit vehicle speed V(tg) predicted during the acceleration period and the driver D loosens the depression of the accelerator 95, the shift threshold setting unit 54 performs the shift-up of the transmission 20. Therefore, the driver D can obtain the expected acceleration in the acceleration period.

(3) The camera 90 (measurement unit) which measures the presence or absence of the preceding vehicle Cf (other vehicle) located in front of the vehicle 1 and the distance Sb and/or the relative speed Vr(t) between the vehicle 1 and the preceding vehicle Cf is provided. The presence or absence of the preceding vehicle Cf and the distance Sb or the relative speed Vr(t) between the vehicle 1 and the preceding vehicle Cf, measured by the camera 90, are used to determine the surrounding state of the vehicle 1.

According to this configuration, in the vehicle 1, it is not necessary to newly provide a measurement unit used to determine the surrounding state of the vehicle 1, and the existing camera 90 mounted on the vehicle can be effectively used.

(4) The shift threshold setting unit 54 sets a maximum vehicle speed during an acceleration period until the vehicle 1 starts to accelerate and then reduces an acceleration amount as the upper limit vehicle speed V(tg), in the operation plan of the vehicle 1, and sets the shift threshold on the basis of the upper limit vehicle speed V(tg).

According to this configuration, in the vehicle 1, the upper limit vehicle speed V(tg) can be accurately set by setting the maximum vehicle speed in the operation plan of the vehicle 1 to the upper limit vehicle speed V(tg), and the shift-up can be reliably prevented from being performed during the acceleration of the vehicle 1.

(5) The shift threshold setting unit 54 sets the upper limit vehicle speed V(tg) on the basis of the relative speed Vr(t) between the vehicle 1 and the preceding vehicle Cf.

According to this configuration, the shift threshold setting unit 54 can calculate the relative speed Vr(t) between the vehicle 1 and the preceding vehicle Cf, on the basis of only measurement information of the existing camera 90 (stereo camera) mounted on the vehicle 1.

As a result, the shift threshold setting unit 54 can set the shift threshold used to determine whether or not to perform the shift-up of the transmission 20 on the basis of only the measurement information of the camera 90.

(6) The shift threshold setting unit 54 sets the upper limit vehicle speed V(tg) on the basis of the relative speed Vr(t) and the distance Sb between the vehicle 1 and the preceding vehicle Cf.

According to this configuration, the shift threshold setting unit 54 can calculate the relative speed Vr(t) and the distance Sb between the vehicle 1 and the preceding vehicle Cf, on the basis of only the measurement information of the existing camera 90 (stereo camera) mounted on the vehicle 1.

As a result, the shift threshold setting unit 54 can set the shift threshold used to determine whether or not to perform the shift-up of the transmission 20 on the basis of only the measurement information of the camera 90, and can calculate the shift threshold with higher accuracy by using the distance Sb.

(7) The shift threshold setting unit 54 has the shift threshold as the shift map 100 where a horizontal axis (one axis) represents a vehicle speed V and a vertical axis (the other axis) represents the accelerator opening A or the throttle opening.

According to this configuration, the shift threshold setting unit 54 temporarily rewrites (changing) the shift threshold of the shift map 100, thereby performing control so as not to perform the shift-up during the acceleration of the vehicle 1.

(8) The shift threshold setting unit 54 sets the shift threshold so that the shift-up of the transmission 20 does not occur, even when the vehicle 1 reaches a margin speed (V(tg)+α) faster by a predetermined speed than the upper limit vehicle speed V(tg), during an acceleration period until an acceleration amount is reduced from a current vehicle speed of the vehicle 1.

According to this configuration, the shift-up is not performed until the vehicle 1 reaches the margin speed (V(tg)+α) faster than the predicted upper limit vehicle speed V(tg) by the predetermined margin amount α. Therefore, even when the vehicle 1 exceeds the predicted upper limit vehicle speed V(tg), the shift-up can be reliably prevented from being performed during the acceleration of the vehicle 1.

(9) The shift threshold setting unit 54 sets the shift threshold so that the shift-up of the transmission 20 does not occur, even when the vehicle 1 reaches the upper limit vehicle speed V(tg), in a state where the accelerator opening A or the throttle opening of the vehicle 1 becomes smaller by the predetermined margin amount β than the current accelerator opening A1 or throttle opening of the vehicle 1.

According to this configuration, even when the accelerator opening A1 according to the depression amount of the accelerator 95 becomes smaller by the predetermined margin amount β due to the variation (play) of the accelerator 95 or the like, the vehicle speed V does not exceed the shift threshold. Therefore, the shift-up can be reliably prevented from being performed during the acceleration of the vehicle 1.

(10) The shift threshold setting unit 54 sets the maximum vehicle speed Vmax so that a noise, a vibration, or deterioration of fuel efficiency does not exceed an allowable limit, when the vehicle travels without performing the shift-up of the transmission 20, and the shift threshold setting unit does not change the shift threshold or changes the shift threshold in a range where the upper limit vehicle speed V(tg) does not exceed the maximum vehicle speed Vmax (maximum vehicle speed set in a range that does not enter an engine overspeed region at each shift position), when the upper limit vehicle speed V(tg) becomes larger than the maximum vehicle speed Vmax.

According to this configuration, in the vehicle 1, the shift-up of the transmission 20 is performed in a range of vehicle speeds equal to or lower than the maximum vehicle speed Vmax set to each shift position. Therefore, it is possible to prevent the noise, the vibration, or the deterioration of the fuel efficiency of the vehicle 1 (drive source 10) due to the vehicle 1 exceeding the maximum vehicle speed Vmax set to each shift position (maximum vehicle speed set in a range that does not enter an engine overspeed region at each shift position).

REFERENCE SIGNS LIST 1 vehicle
10 drive source
11 output shaft
20 transmission
21 propeller shaft
30 differential gear
40 tire
50 T/M-ECU
51 CPU
52 RAM
53 ROM
54 shift threshold setting unit
60 AD/ADAS-ECU
70 ENG-ECU
90 camera
91 radar
92 ultrasonic wave
95 accelerator
98 in-vehicle communication path
100 shift map
101 1-2 shift threshold
102 2-3 shift threshold
103 3-4 shift threshold
104 4-5 shift threshold
150 control program
A accelerator opening
A1 current accelerator opening
D driver
V vehicle speed
V1 current vehicle speed
V(tg) upper limit vehicle speed
Vmax maximum vehicle speed
Cf preceding vehicle

The invention claimed is:

1. A transmission control device for a vehicle, comprising:
a control unit configured to automatically perform shift control for switching a plurality of gears of a multi-stage transmission for shift-up or shift-down, wherein the control unit has a shift threshold setting unit configured to set a shift threshold to be used for the shift control, on the basis of an operation plan or a surrounding state of the vehicle, and
the shift threshold setting unit is configured to set the shift threshold to perform the shift control on the multi-stage transmission so as not to perform the shift-up of the multi-stage transmission during acceleration of the vehicle; and
a measurement unit configured to measure the presence or absence of an other vehicle located in front of the vehicle and a distance and/or a relative speed between the vehicle and the other vehicle, wherein
the presence or absence of the other vehicle and the distance or the relative speed between the vehicle and the other vehicle, measured by the measurement unit, are used to determine the surrounding state.

2. The transmission control device for the vehicle according to claim 1, wherein the shift threshold setting unit is configured to set the shift threshold, on the basis of an upper limit vehicle speed of the vehicle to be predicted during an acceleration period until the vehicle starts to accelerate and then reduces an acceleration amount.

3. The transmission control device for the vehicle according to claim 1, wherein the shift threshold setting unit is configured to set a maximum vehicle speed during an acceleration period until the vehicle starts to accelerate and then reduces an acceleration amount as an upper limit vehicle speed, in the operation plan of the vehicle, and is configured to set the shift threshold on the basis of the upper limit vehicle speed.

4. The transmission control device for the vehicle according to claim 1, wherein the shift threshold setting unit has the shift threshold as a shift map where one axis represents a vehicle speed and the other axis represents an accelerator opening or a throttle opening.

5. The transmission control device for the vehicle according to claim 4, wherein the shift threshold setting unit is configured to set the shift threshold so that the shift-up of the multi-stage transmission does not occur, even when the vehicle reaches an upper limit vehicle speed, in a state where the accelerator opening or the throttle opening of the vehicle becomes smaller by a predetermined amount than a current accelerator opening or throttle opening of the vehicle.

6. The transmission control device for the vehicle according to claim 1, wherein the shift threshold setting unit is configured to set the shift threshold so that the shift-up of the multi-stage transmission does not occur, even when the vehicle reaches a margin speed faster by a predetermined speed than an upper limit vehicle speed, during an acceleration period until an acceleration amount is reduced from a current vehicle speed of the vehicle.

7. The transmission control device for the vehicle according to claim 1, wherein the shift threshold setting unit is configured to set a maximum vehicle speed so that a noise, a vibration, or deterioration of fuel efficiency does not exceed an allowable limit, when the vehicle travels without performing the shift-up of the multi-stage transmission, and the shift threshold setting unit is configured to not change the shift threshold or to change the shift threshold in a range where an upper limit vehicle speed does not exceed the maximum vehicle speed, when the upper limit vehicle speed becomes larger than the maximum vehicle speed.

8. A transmission control device for a vehicle, comprising:

a control unit configured to automatically perform shift control for switching a plurality of gears of a multi-stage transmission for shift-up or shift-down, wherein the control unit has a shift threshold setting unit configured to set a shift threshold to be used for the shift control, on the basis of an operation plan or a surrounding state of the vehicle, the shift threshold setting unit is configured to set the shift threshold to perform the shift control on the multi-stage transmission so as not to perform the shift-up of the multi-stage transmission during acceleration of the vehicle, and wherein the shift threshold setting unit is configured to set the shift threshold, on the basis of an upper limit vehicle speed of the vehicle, to be predicted during an acceleration period until the vehicle starts to accelerate and then reduces an acceleration amount, wherein the shift threshold setting unit is configured to set the upper limit vehicle speed on the basis of a relative speed between the vehicle and an other vehicle.

9. The transmission control device for the vehicle according to claim 8, wherein the shift threshold setting unit is configured to set the upper limit vehicle speed on the basis of the relative speed and a distance between the vehicle and the other vehicle.

* * * * *